A. R. BEAL & A. HETTEL.
DISH WASHING MACHINE.
APPLICATION FILED MAR. 29, 1907.
972,747.
Patented Oct. 11, 1910.
2 SHEETS—SHEET 1.
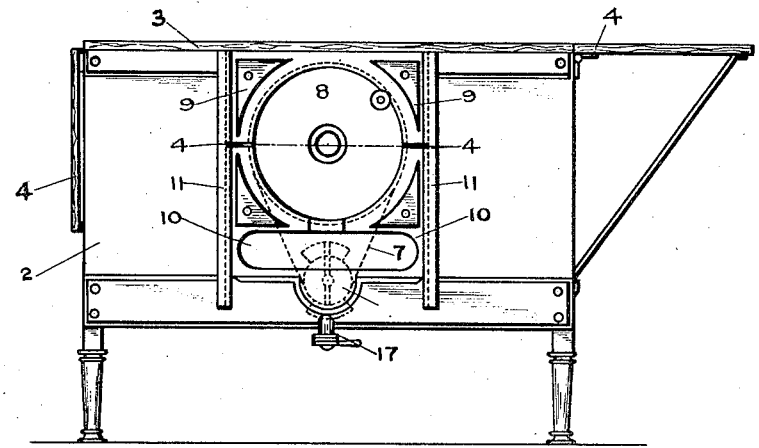
FIG. 1.
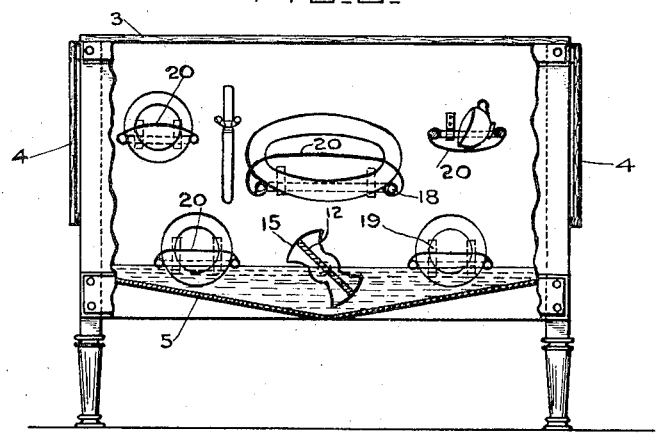
FIG. 2.
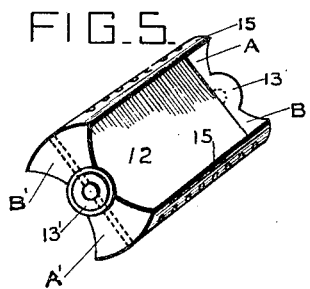
FIG. 5.
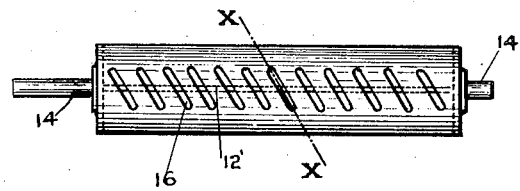
FIG. 6.
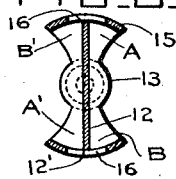
FIG. 6ᴬ.
WITNESSES:
INVENTORS:

A. R. BEAL & A. HETTEL.
DISH WASHING MACHINE.
APPLICATION FILED MAR. 29, 1907.
972,747.
Patented Oct. 11, 1910.
2 SHEETS—SHEET 2.
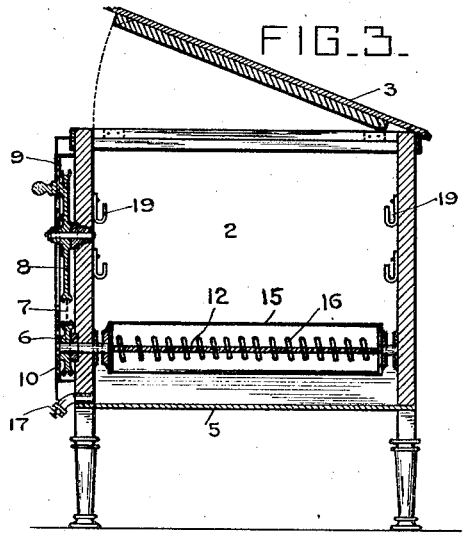
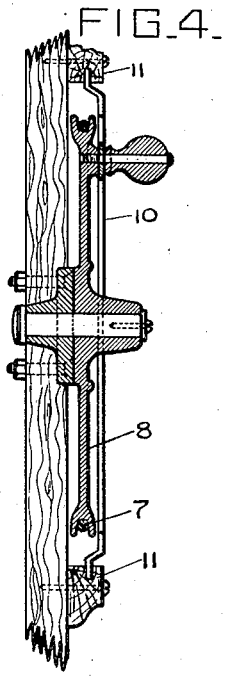
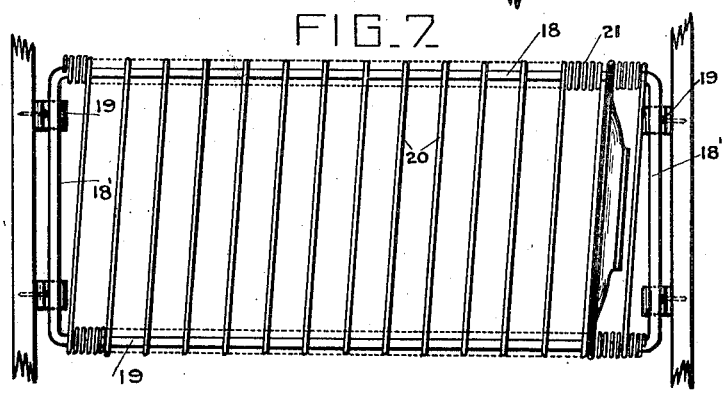
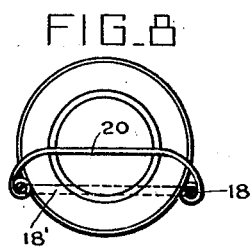
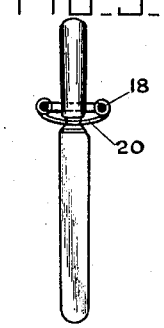
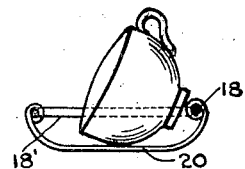
WITNESSES:
INVENTORS:-

UNITED STATES PATENT OFFICE.

ALPHA R. BEAL AND ANTON HETTEL, OF ROCHESTER, NEW YORK; SAID HETTEL ASSIGNOR TO SAID BEAL.

DISH-WASHING MACHINE.

972,747.

Specification of Letters Patent. Patented Oct. 11, 1910.

Application filed March 29, 1907. Serial No. 365,227.

*To all whom it may concern:*

Be it known that we, ALPHA R. BEAL and ANTON HETTEL, residents of Rochester, in the county of Monroe and State of New York, have invented certain new and useful Improvements in Dish-Washing Machines, of which the following is a specification.

This invention relates to dish-washing machines, and one object is to provide an improved sprayer or agitator for effectively and forcefully spraying or throwing water against and around all of the dishes contained in the tank so that all portions thereof are thoroughly cleansed.

A further object is to provide a reversible sprayer, one that operates as effectually when rotating in one direction as in the other.

Still a further purpose is to so arrange the sprayer that the water is sprayed in opposite or reverse diagonal directions so that the direct force of the water reaches and acts on all surfaces of the dishes being cleaned.

The invention also includes dish holding racks of improved construction.

In the accompanying drawings, Figure 1 is a front elevation of the improved machine, and Fig. 2 is a vertical longitudinal sectional view. Fig. 3 is a vertical central cross-sectional view. Fig. 4 is a sectional plan view, enlarged, of the driving mechanism, taken on line 4—4 of Fig. 1. Figs. 5, 6, and 6ª are detail views of the improved sprayer, Fig. 6ª being a cross-section on line X—X of Fig. 6. Figs. 7, 8, 9, and 10 are detail views of the dish holding racks.

The machine of this application is designed primarily for domestic or family use, being here shown as a hand operated machine, as distinguished from power driven machines adapted for hotels, restaurants, etc. We have therefore embodied the machine in a combined table and cabinet which may be conveniently placed in any kitchen, serving ordinarily as a table, and at the same time as a cabinet for dishes, as the latter need not be removed after being washed until again required for use. This, however, is merely our preferred embodiment of the invention, and it will be understood that the features herein claimed are applicable to dish-washing machines of various kinds and regardless of whether they are hand or power operated.

Referring to drawings, 2 designates a rectangular tank, and 3 the flat table-like top or cover therefor, hinged at one edge as shown. The table surface may be extended or enlarged by shelves 4 which may be hinged to one or both ends of the table. We thus provide an article of furniture which affords ample table room.

The bottom 5 of tank 2 slopes downwardly toward the center from opposite ends, and journaled in opposite sides of the tank a short distance above the center of the bottom is the rotatable sprayer, one of the end journals of which extends through the front of the tank and carries pulley 6, which is connected by belt 7 with the large drive wheel 8, whereby the sprayer is rotated at high speed. All of the gearing, excepting the face of the large wheel 8, is inclosed by upper and lower case sections 9 and 10 which, respectively, are adapted to slide upward and downward in grooves formed in cleats or bars 11.

The rotatable sprayer is preferably constructed of a plate-like central or body portion 12, to which end members 13 are secured, and from which project journals 14. The sprayer is provided with four buckets by securing plates 15 midway of their longer edges to each of the longitudinal edges 12′ of central plate 12, a half of each of plates 15 projecting on each face of plate 12 as shown. Plates 15 are preferably, though not necessarily, curved and are fitted and secured to end members 13, as shown. Each of plates 15 is formed with a series of slots 16 which are arranged diagonally to the plane of the sprayer axis. Each of these series of slots is intersected centrally by edge 12′ of the body, thus dividing the slots between the opposite buckets. The slots 16 in the two plates 15 are disposed in opposite directions—that is, viewing the sprayer from a given point the slots in one plate are inclined oppositely to the slots of the other plate when the agitator is so turned as to present the other plate to the point of view. The result of this arrangement is that when one plate is in upward and the other downward position the slots are disposed in the same direction.

In operation, the uppermost bucket A at one side of the body 12, and the lowermost bucket A′ at the opposite side, coöperate when the sprayer is being rotated in one direction, while when rotating in the opposite direction buckets B and B' coöperate. The active buckets pick up the water as the sprayer rotates, and tend to confine and carry over the same by centrifugal force, and the water, seeking an escape, is sprayed or discharged through slots 16 with great force against the dishes and in fact all portions of the interior of tank 2. Owing to the oblique direction of the slots, and to the fact that they extend in reverse directions in the two active buckets, the water discharges through one of said buckets in a slanting or diagonal direction, and in just the opposite slanting or diagonal direction from the other bucket. Thus, the water is sprayed with much force against all parts of the dishes and they are thoroughly cleansed. Furthermore, the double construction of the sprayer provides for completely reversing the spraying operation in every particular, this being a very important feature in the effective operation of the machine. In practice, when a comparatively small amount of wash-water or "suds" is necessary, a few turns of the operating wheel 8, first in one direction and then in the other, is all that is required. This water is then drawn off through outlet 17 and a small quantity of hot rinsing water is introduced and the sprayer operated for a brief period. The heat derived from the washing and rinsing waters is sufficient to dry the dishes, and if desired they can remain in the tank until they are required for use, thus providing a dish closet or repository in connection with the combined washing machine and table.

The racks for sustaining the dishes consist preferably of a heavy wire frame 18 of oblong form, the end members 18' thereof removably engaging hooks 19, secured to the inner walls of the tank. The transverse members of the holder consist of wire strands 20 which, in the preferred embodiment of the invention, are all formed of a single piece of wire extended from one side of frame 18 to the other, the wire being coiled around the frame sides between the strands, as indicated at 21, the number of convolutions depending upon the distance apart it is desired to place strands 20. The strands are bowed or deflected between the sides of frame 18, the deflection being upward for supporting plates and other flat ware, as shown in Figs. 7 and 8, while for holding cups and similar dishes the holders are simply inverted, forming baskets as indicated in Fig. 10. Racks of similar construction, but with strands 20 quite close together, may be provided for holding knives, forks, and spoons, as shown in Fig. 9.

We claim:

1. A rotatable sprayer for dish-washing machines consisting of a central body portion, oppositely facing buckets on each of the two faces of the body in which water is held by centrifugal action, two of said buckets—one on each face—being active when the sprayer is rotating in one direction and the other two when rotating in the opposite direction, each of the buckets having slots extending diagonally to the plane of the body portion.

2. A rotatable sprayer for dish-washing machines comprising a central or plate-like body portion, a bucket-forming plate secured to each of the longitudinal edges of the body, each of said plates being secured midway its longitudinal edges for forming a bucket at each of the opposite sides or faces of the body, each of said bucket-forming plates having a series of diagonal slots traversed by the edge of the body portion and thus divided between the opposite buckets.

3. A rotatable sprayer for dish-washing machines comprising a plate-like body portion, two bucket-forming plates each having one of its side faces secured, midway its longitudinal edges, to an edge of the body portion, each of the bucket-forming plates having a series of slots disposed diagonally to the axial line of the body portion, the diagonal slots in one plate extending in a reverse direction to those of the other plate, each of the slot series being traversed by the edge of the body portion and thus divided between the opposite buckets.

In testimony whereof we affix our signatures in presence of two witnesses.

ALPHA R. BEAL.
ANTON HETTEL.

Witnesses:
MARY MADDEN,
FRANK U. FRY.